United States Patent
Lichtenhan et al.

(10) Patent No.: US 7,265,194 B1
(45) Date of Patent: Sep. 4, 2007

(54) POLYHEDRAL OLIGOMERIC SILSESQUINOXANES AND POLYHEDRAL OLIGOMERIC SILICATES BEARING SURFACTANT FUNCTIONALITIES

(75) Inventors: Joseph D. Lichtenhan, Petal, MS (US); Joseph J. Schwab, Huntington Beach, CA (US)

(73) Assignee: Hybrid Plastics Inc., Hattiesburg, MS (US)

( * ) Notice: Subject to any disclaimer, the term of this patent is extended or adjusted under 35 U.S.C. 154(b) by 0 days.

(21) Appl. No.: 10/968,370

(22) Filed: Oct. 18, 2004

Related U.S. Application Data

(60) Provisional application No. 60/512,353, filed on Oct. 16, 2003.

(51) Int. Cl.
*C08G 77/38* (2006.01)

(52) U.S. Cl. .................. 528/28; 524/266; 524/268; 528/25

(58) Field of Classification Search ............ None
See application file for complete search history.

(56) References Cited

U.S. PATENT DOCUMENTS

2002/0052434 A1* 5/2002 Lichtenhan et al. ........ 524/261

2005/0142054 A1* 6/2005 Hasegawa et al. .......... 423/325

OTHER PUBLICATIONS

"Silicate Species with Cagelike Structure in Solutions and Rapid Solidification with Organic Quaternary Ammonium Ions" authored by Hasegawa et al. and published in Zeolite Synthesis (ACS Symposium Series, 1989, vol. 398, p. 140-151.*
"Two Substituted Cubic Octameric Silicate Cages in Aquoues Solution" authored by Kinrade et al. and published in J. Chem Soc. Dalton. Trans., 2002, vol. 7, p. 1250-1252.*

* cited by examiner

*Primary Examiner*—Marc S. Zimmer
(74) *Attorney, Agent, or Firm*—David H. Jaffer; Pillsbury Winthrop Shaw Pittman LLP

(57) ABSTRACT

This invention teaches the preparation and compositions of POSS nanostructured chemicals bearing a variety of onium-type surfactants. The surfactants serve as low-cost compatibilizing groups for polyhedral oligomeric silsesquioxane and polyhedral oligomeric silicate nanostructures with man-made polymer and biological systems. Variations of the surfactants also provide reactivity for the nanostructured chemicals with man-made and biological materials. The surfactant bearing nanostructured chemicals are useful as alloying agents is for controlling the structure and bulk physical properties of materials from the nanoscopic length scale. Alternately, the surfactants can be eliminated from the nanostructures to render the formation of nanoscopically dispersed silica particles.

14 Claims, No Drawings

POLYHEDRAL OLIGOMERIC SILSESQUINOXANES AND POLYHEDRAL OLIGOMERIC SILICATES BEARING SURFACTANT FUNCTIONALITIES

CROSS-REFERENCE TO RELATED APPLICATIONS

This application claims the benefit of U.S. Provisional Application No. 60/512,353 filed Oct. 16, 2003.

BACKGROUND OF THE INVENTION

Polyhedral oligomeric silsesquioxanes and polyhedral oligomeric silicate nanostructured chemicals are often immiscible in hydrocarbon polymers. For this reason, it is desirable to incorporate organic functionalities onto the nanostructures for the purposes of compatibilization and controlling reactivity with polymers or biological systems. Traditionally the processes affording the incorporation of organic functionalities have been dictated by the choice of organosilane or has been accomplished through use of hydrosilation, cross metathesis, Heck, Grignard, or other organic manipulations. Despite the amenability of such techniques to economical commercial-scale manufacturing and to operation at pre or post assembly of the nanostructure further simplification and lower cost methods are desired.

For these reasons, an inorganic method for treatment of the silsesquioxane and silicate nanostructures present in polyhedral oligomeric silsesquioxanes (POSS) and polyhedral oligomeric silicates (POS) to render them organophillic was developed. The method involves the introduction of an organic compound containing a positively charged functional group such as a quaternary onium that can ion exchange with counter-ions associated the silicate atoms in the POSS/POS. In this way, the inorganic onium group becomes ionically tethered to the silicate atoms of the nanostructured chemical while the organic groups of the onium solvate and in some cases react with the polymer. The result of the interaction between the onium-modified POSS/POS nanostructured chemical and the polymer can then range from an immiscible mixture to that of a fully compatible and nano-dispersed composite depending on the degree of compatibility achieved.

This invention describes methods of preparing new POSS/POS nanostructured chemical compositions that take advantage of a wide variety of "onium" surfactants for use as compatibilizing and functionally reactive groups on the external surface of the nanostructure. Onium groups have been successfully utilized in the compatibilization of layered mineral-type silicates (e.g. mica, bentonite, hectorite, montmorillonite, laponite) with polymers. A wide variety of onium-based surfactant systems have been developed such purposes (Scheme 1)

Scheme 1.

A general onium formula is represented by $[R_4M]^+$ and $[R_3HN]^+$.

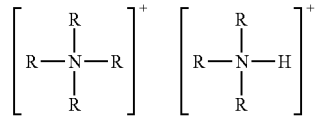

In general the term onium is intended to refer to $[R_4M]^+$ and $[R_3HM]^+$ groups where M=N, P, Se, Te and where all R may be either equivalent or inequivalent or combinations thereof and where organic R groups are selected from alkyl, alkenyl, alkyne, aliphatic, aromatic, or the same containing reactive groups that include alcohol, epoxy, ether, ketone, acid, ester, peroxide, amine, amide, imide, azine, nitrile, isocyante, sulfur, phosphorus, and halides. Commercially important examples of onium groups include: N,N-dimethyammonium stearate, N-methylammonium distearate, benzylmethylammonium stearate, tetramethyl ammonium, trimethyl ammonium, tetraethylammonium, triethyl ammonium, benzyltrimethyl ammonium, methyldihydroxyethyltallow, and tetramethylphosphonuim. Onium systems are most commonly utilized as surfactants and thus are commonly referred to as such by those skilled in the art.

Prior art with POSS/POS nanostructured chemicals has shown that they can be incorporated in all three dimensions at the nanoscopic level in polymers. The principal advantage of onium surfactant modified POSS systems is their lower cost relative to POSS/POS systems derived from organosilanes, siloxane, or silsesquioxane sources. Some of the onium groups may also exhibit biocidal activity or related biological activity and thereby be additionally advantageous for commercial markets. Additionally some onium surfactants can subsequently be removed using thermal or chemical methods. Treatment of surfactant modified POSS/POS systems in a similar manner would render uniformly dispersed nanosilica particles ranging in size from 0.7 nm to 10 nm. When incorporated into man-made or biological materials, surfactant modified POSS/POS chemicals can result in increased scratch and mar resistance, improve processability, reduce viscosity, improved fire retardancy, improved permeability, reduced shrinkage and thermal expansion characteristics. The invention is not limited to any specific class of nanostructures, rather it utilizes monodisperse nanosizes, and distributions of nanosized reinforcements, to improve the physical characteristics of glassy, crystalline, amorphous, semicrystalline, rubbery and optical polymers. The resulting nano-alloyed polymers are wholly useful by themselves or in combination with other polymers or in combination with macro- and nano-scopic reinforcements such as fiber, clay, glass mineral and other fillers.

It has long been recognized that the morphology of polymers can be controlled to a high degree through variables such as composition, thermodynamics, and processing conditions. It is similarly known that the usage of fillers (e.g. calcium carbonate, silica, carbon black, etc.) of various sizes and shapes can be utilized to effectively control both polymer morphology and resulting physical properties. Furthermore it has been calculated that as filler sizes decrease below 50 nm they are more resistant to sedimentation and are more effective at providing reinforcement to polymer systems. The full application of this theoretical knowledge however has been thwarted by the lack of a practical source of particulates with monodispersity and diameters below the 10 nm range.

DEFINITION OF FORMULA REPRESENTATIONS FOR NANOSTRUCTURES

For the purposes of understanding this invention's chemical compositions the following definition for formula representations of and Polyhedral Oligomeric Silicate (POS) and Polyhedral Oligomeric Silsesquioxane (POSS) nanostructures is made.

Polymeric polyhedral oligomeric silicates are materials represented by the formula $[AXSiO_{1.5}]_\infty$, while discrete polyhedral oligomeric silicates are represented by the formula $[(AXSiO_{1.5})_n]\Sigma\#$. Polyhedral oligomeric silsesquioxanes with open cages are represented by the formula $[(RSiO_{1.5})_n(RAXSiO_{1.0})_m]\Sigma\#$ while polyhedral oligomeric silsesquioxanes with closed cages are represented by the formula $[(RSiO_{1.5})_n(AXSiO_{1.5})_m]\Sigma\#$. For each formula the A is an onium cation represented primarily by ammonium or phosphonium salts, most commonly derived from common surfactants that may contain organic, X=an anionic group most commonly in the form of oxygen, ∞=molar degree of polymerization ranging from 37–infinity (∞). The symbols n and m refer to the stoichiometry of the composition and n=1–36, m=1–36. The symbol Σ indicates that the composition forms a nanostructure and the symbol # refers to the number of silicon atoms contained within the nanostructure. It should be noted that Σ# is not to be confused as a multiplier for determining stoichiometry, as it merely describes the overall nanostructural characteristics of the system (aka cage size).

DETAILED DESCRIPTION OF THE INVENTION

This invention teaches the use of surfactants as a low-cost means for compatibilizing Polyhedral Oligomeric Silsesquioxane (POSS) and particularly Polyhedral Oligomeric Silicate (POS) nanostructured chemicals with man-made and biological materials.

Surfactant modified nanostructured chemicals are best exemplified by those based on low-cost Polyhedral Oligomeric Silsesquioxanes (POSS) and Polyhedral Oligomeric Silicates (POS) (Scheme 2).

Scheme 2.

Examples of surfactant modified POSS and POS nanostuctured chemicals.

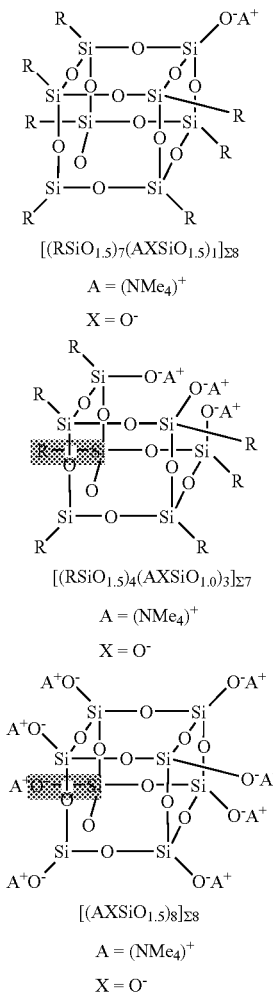

These systems contain hybrid (organic-inorganic) compositions in which the internal frameworks are primarily comprised of inorganic silicon-oxygen bonds. The exterior of the nanostructure is covered by both organic functionalities (R) and a number of onium surfactants, thus ensuring compatibility and tailorability of the nanostructure with organic polymers. When compatibilized with both R groups and surfactants or with surfactants alone they can they exhibit compatibility with both man-made and biological systems in the same manner as previously described for POSS systems. In addition to being lower-cost, many surfactant modified systems exhibit water solubility and the capacity to function as a phase-transfer catalyst between organic and water based phases. Such capability is desirable for catalysis, emulsions, and latex applications as well as for biological activity and transport phenomena.

The preferred method for preparation for surfactant modification involves the exchange of onium salts or the reaction of silanol functionalized species with the desired onium chloride. The process may be conducted using ion exchange chromatography (e.g. cation exchange beads such as Amberlite® or other polymeric supports), in solution, or in the solid-state. Regardless of the processing method, each results in placement of the desired onium onto the cage via the elimination of a salt (Scheme 3).

Scheme 3.

Processes for the incorporation of onium surfactant groups onto POSS/POS cages.

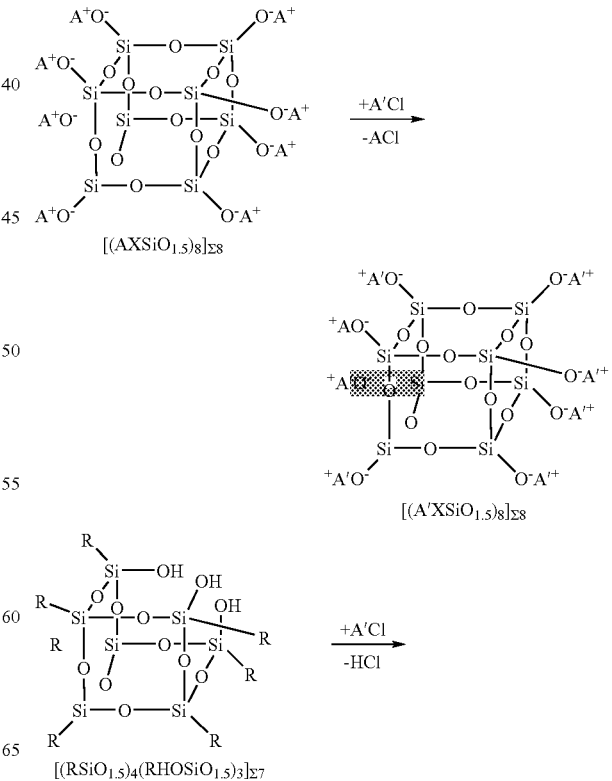

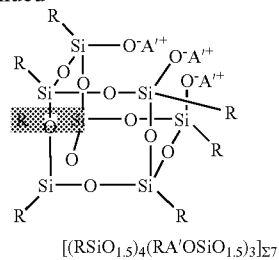

[(RSiO$_{1.5}$)$_4$(RA'OSiO$_{1.5}$)$_3$]$_{\Sigma 7}$

The resulting surfactant modified systems exist as crystalline, semicrystalline, and amorphous solids and as oils. All forms dissolve in solvents and can be incorporated into molten polymers through use of common blending techniques such as extrusion, milling, and blending. It is especially desirable that certain onium systems (e.g. tetramethyl ammonium) exhibit good water solubility and thereby do not require the use of volatile and flammable organic solvents.

The incorporation of certain onium salts with low-decomposition points onto the systems described in (Scheme 4) can afford the ability to generate nano-silica cages via degradation of the onium group into volatiles. Alternately, onium groups can also be removed via treatment with chemical acids or bases to render the in situ generation of uniformly dispersed nano-silica particles within a material, thus solving the long-standing problem associated with dispersing silicate fillers into a material.

Scheme 4.

Decomposition and volatilization of the onium group.

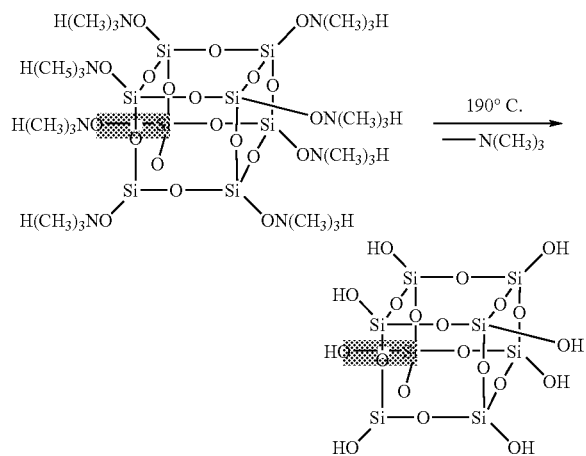

The size of surfactant modified POSS/POS are roughly equivalent to that of most polymer dimensions, thus at a molecular level POSS can effectively alter the motion of polymer chains (see Table 1).

TABLE 1

Relative sizes of POSS, polymer dimensions, and fillers.

| Particle Type | Particle Diameter |
| --- | --- |
| Amorphous Polymer Segments | 0.5–5 nm |
| Octacyclohexyl POSS | 1.5 nm |
| Random Polymer Coils | 5–10 nm |

TABLE 1-continued

Relative sizes of POSS, polymer dimensions, and fillers.

| Particle Type | Particle Diameter |
| --- | --- |
| Colloidal Silica | 9–80 nm |
| Crystalline Lamellae | 1.0–9,000 nm |
| Fillers/Organoclays | 2–100,000 nm |

The ability of nano-scale silica to control chain motion is particularly apparent when POSS is molecularly dispersed into a material. POSS nanostructures act to retard chain motion and greatly enhance time dependent properties such as $T_g$, HDT, Creep, and Set, and increase other physical properties such as permeability, dielectric constant, shrinkage, and expansion coefficient. Furthermore, because of their spherical shapes, like molecular spheres, they are also effective at reducing the viscosity of polymer systems. This benefit is similar to that produced through the incorporation of plasticizers into polymers, yet with the added benefit of reinforcement of the individual polymer chains due to the nanoscopic nature of the chemicals. Thus, ease of processability and reinforcement effects are obtainable through the use of nanostructured chemicals (e.g. POSS, POS).

EXAMPLES

General Process Variables Applicable to all Processes

As is typical with chemical processes, there are a number of variables that can be used to control the purity, selectivity, rate and mechanism of any process. Variables influencing the process for the incorporation of surfactant molecules onto Polyhedral Oligomeric Silsesquioxanes or Polyhedral Oligomeric Silicate cages include the size and polydispersity, and composition of the nanostructured chemical. Finally the kinetics, thermodynamics, and other process aids are also tools of the trade that can impact the loading level and degree of enhancement resulting from incorporation of surfactants into such nanostructured chemicals. Both melt blending, dry blending and solution mixing blending techniques are effective at incorporating surfactant molecules onto nanostructured chemicals. Such surfactant modified nanostructured chemicals have direct utility as alloying agents and additives in polymer systems to improve their physical properties.

The following provides an example of how Polyhedral Oligomeric Silsesquioxanes and Polyhedral Oligomeric Silicates can be modified with surfactants.

Example

A 1.0 g sample of the white microcrystalline octatetramethyl ammonium POS was dissolved into 5 ml of deionized water. To this solution was add a stoichiometrically equivalent amount of benzyltrimethyl ammonium chloride and the mixture was stirred for 10 minutes at 25° C. Then 50 ml of hexane was added to the mixture to form a second layer into which the resulting octabenzyltrimethyl ammonium POS was extracted. Upon removal of volatiles and drying a quantitative amount of product was obtained. The octabenzyltrimethyl ammonium POS was observed to be significantly more compatibilized toward aromatic based polymers such as polystyrene that the original octatetramethyl ammonium POS.

What is claimed is:

1. A composite material comprising a nanostructured chemical composition selected from the group consisting of polyhedral oligomeric silicate (POS) having at least one onium group and polyhedral oligomeric silsesquioxane (POSS) having at least one onium group reactively copolymerized, grafted, or cross-linked with a polymer.

2. The composition of claim 1, wherein the nanostructured chemical composition is selected from the group consisting of compounds having the formula $[(AXSiO_{1.5})_n]\Sigma\#$, $[(RSiO_{1.5})_n(RAXSiO_{1.0})_m]\Sigma\#$, and $[(RSiO_{1.5})_n(AXSiO_{1.5})_m]\Sigma\#$, wherein:

(a) A is an onium cation having the formula $[R_4M]^+$ or $[R_3HM]^+$, where M=N, P, Se or Te, and each R in the onium cation may be the same or different and is an organic group selected from the group consisting of substituted and unsubstituted alkyl, alkenyl, alkyne, aliphatic, and aromatic, where substituted organic groups are selected from the group consisting of alcohol, epoxy, ether, ketone, acid, ester, peroxide, amine, amide, imide, azine, nitrile, isocyante, sulfur, phosphorous, and halides; and (b) X is an anionic group;

where n and m refer to the stoichiometry of the composition and n and m may each be in the ranges 1–36, $\Sigma$ indicates the composition forms a nanostructure, and # refers to the number of silicon atoms contained in the nanostructure (m+n).

3. The composition of claim 2, where X is oxygen and M is nitrogen or phosphorous.

4. The composition of claim 1, wherein the composition serves as a biocide.

5. A composite material comprising a nanostructured chemical composition selected from the group consisting of polyhedral oligomeric silicate (POS) having at least one onium group and polyhedral oligomeric silsesquioxane (POSS) having at least one onium group non-reactively compounded with a polymer.

6. The composition of claim 5, wherein the nanostructured chemical composition is selected from the group consisting of compounds having the formula $[(AXSiO_{1.5})_n]\Sigma\#$, $[(RSiO_{1.5})_n(RAXSiO_{1.0})_m]\Sigma\#$, and $[(RSiO_{1.5})_n(AXSiO_{1.5})_m]\Sigma\#$, wherein:

(a) A is an onium cation having the formula $[R_4M]^+$ or $[R_3HM]^+$, where M=N, P, Se or Te, and each R in the onium cation may be the same or different and is an organic group selected from the group consisting of substituted and unsubstituted alkyl, alkenyl, alkyne, aliphatic, and aromatic, where substituted organic groups are selected from the group consisting of alcohol, epoxy, ether, ketone, acid, ester, peroxide, amine, amide, imide, azine, nitrile, isocyante, sulfur, phosphorous, and halides; and (b) X is an anionic group;

where n and m refer to the stoichiometry of the composition and n and m may each be in the ranges 1–36, $\Sigma$ indicates the composition forms a nanostructure, and # refers to the number of silicon atoms contained in the nanostructure (m+n).

7. The composition of claim 5, where X is oxygen and M is nitrogen or phosphorous.

8. The composition of claim 5, wherein the composition serves as a biocide.

9. A process for functionalizing POS or POSS with a surfactant functionality, comprising reacting a POS or POSS silanol with an onium halide.

10. The process of claim 9, wherein the onium halide includes an onium cation having the formula $[R_4M]^+$ or $[R_3HM]^+$, where M=N, P, Se or Te, and each R may be the same or different and is an organic group selected from the group consisting of alkyl, alkenyl, alkyne, aliphatic, and aromatic, where substituted organic groups are selected from the group consisting of alcohol, epoxy, ether, ketone, acid, ester, peroxide, amine, amide, imide, azine, nitrile, isocyante, sulfur, phosphorous, and halides.

11. The process of claim 10, where M is nitrogen or phosphorous.

12. A process for exchanging onium cations on POS or POSS having a first onium cation, comprising reacting a second onium cation with said POS or POSS, whereby the second onium cation attaches to the POS or POSS and the first onium cation is eliminated from the POS or POSS as a salt.

13. A method for incorporation of a nanostructured chemical composition selected from the group consisting of POS having at least one onium group and POSS having at least one onium group into a polymer, wherein the composition is incorporated into the polymer using a process selected from the group consisting of melt blending, dry blending, solution blending, and chemical reaction.

14. A method for incorporating silicon nanostructures into a material comprising the method of claim 13 and further comprising the step of removing the onium group using a process selected from the group consisting of heating to decompose the onium group, treating with an acid, and treating with a base.

* * * * *